United States Patent Office 3,296,080
Patented Jan. 3, 1967

3,296,080
LINALOOL HOMOLOGUES
Walter C. Meuly, New Brunswick, and Petko S. Gradeff, Franklin Township, Somerset County, N.J., assignors to Rhodia Inc., New York, N.Y., a corporation of New York
No Drawing. Filed Aug. 8, 1963, Ser. No. 300,907
12 Claims. (Cl. 167—94)

This invention relates to a number of novel compositions of matter, being valuable odoriferous materials as such, or key intermediates. They have utility in the perfume, cosmetic, or flavor industries. They are especially valuable as odor-imparting agents in perfume compositions. Some of them are distinctly novel odors of great potential value, others are related to known odoriferous material but all have novel nuances, great intensity and lasting power.

In the art of perfumery, the terpenic alcohol linalool, the terpenic aldehyde citral and the ketonic ionones have long been known and used as valuable ingredients. Their importance has led to their synthetic manufacture to replace natural oils of foreign origin. In addition many homologous products have been prepared by substituting alkyl groups for hydrogen in various positions of the linalool citral and ionone molecule.

(A)
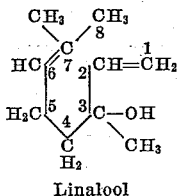
Linalool

In the case of linalool the prior art reveals homologs with alkyl substitutions in positions 1, 2, 5, 6, 8 and to a limited degree in position 4. Winter et al. Helv. 30 (1947) 2213, describes a compound of this type where $R_1$ and $R_2$ are methyl groups. No compounds are known, however, in which the alkyl group in the 3 position is other than methyl. Our novel unsaturated alcohols are characterized by novel alkyl substituents in positions 3 and/or 4 only, and many of the new products possess unusually desirable odor properties which brings them closer to valuable natural oils such as lavender, bergamot, geranium.

In a comprehensive embodiment, these novel unsaturated alcohols are tertiary carbinols, corresponding to the general formula (B)
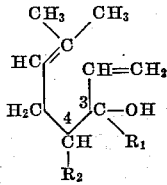

where $R_1$ is a lower alkyl group other than methyl and containing from two to six carbon atoms and $R_2$ is H or a lower alkyl group containing one to five carbon atoms. $R_1$ and $R_2$ may form together a trimethylene or tetramethylene group. If $R_2$ is greater than methyl, $R_1$ may be methyl. The 4-position of the carbinol may be substituted by two methyl groups in place of H and $R_2$. These tertiary carbinols can be prepared conveniently from a group of novel ketones disclosed in our copending application Serial No. 241036, now abandoned, examples 33, 62 to 73, by reacting said ketones with acetylene to form ethynyl carbinols, followed by selective hydrogenation to vinyl-carbinols or by reacting said ketones with vinyl magnesium halide to yield directly the vinyl carbinols, according to reaction 1

(1)
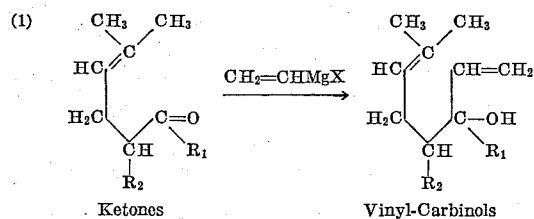

Ketones        Vinyl-Carbinols where $R_1$ and $R_2$ have the same meanings as above. As is pointed out in said copending application Serial No. 241036, the ketones are formed in a very economical manner which makes the products of the present application available at a low cost which further enhances their value as perfumery chemicals. The ketones of application Serial No. 241036 are obtained as a mixture of two isomers, if derived from an unsymmetrical starting ketone with a hydrogen atom in each of the two alpha positions. While it is usually possible to separate the isomers by fractional distillation it has been found that the mixed ketones lead to a mixture of two isomeric vinyl carbinols which possess excellent odor characteristics, richer and closer to natural products (which are normally mixtures of related chemicals). While we describe in several examples below the properties of the mixed vinyl carbinols (which are obtained in definite ratios from the corresponding ketone mixtures of Serial No. 241036) it is understood that the individual isomers that make up the mixtures are also within the scope of this invention.

The invention is further disclosed in the following examples, which are illustrative but not limitative thereof. For greater convenience in tracing the novel linalool homologs described in the examples below, they are listed in Table I along with the number of the example and the significance of the substituents $R_1$ and $R_2$ in the general Formula B, above.

TABLE I

| Example No. | Novel Linalool Homolog | $R_1$ | $R_2$ |
|---|---|---|---|
| 1 | 4,7-dimethyl-3-ethyl-1,6-octadien-3-ol | $C_2H_5$ | $CH_3$. |
|   | 1-vinyl-2-(3-methyl-2-buten-1-yl)-cyclohexanol | $CH_2CH_2CH_2CH_2$ | $CH_2CH_2CH_2CH_2$. |
| 2 | 7-methyl-3-ethyl-1,6-octadien-3-ol | $C_2H_5$ | H. |
| 3 | 3,4,4,7-tetramethyl-1,6-octadien-3-ol | $CH_3$ | $(CH_3)_2$ 4 in position. |
| 4 | 7-methyl-3-isopropyl-1,6-octadien-3-ol | $(CH_3)_2CH$ | H. |
|   | 3,7-dimethyl-4-ethyl-1,6-octadien-3-ol | $CH_3$ | $C_2H_5$. |
| 5 | 7-methyl-3-propyl-1,6-octadien-3-ol | $CH_3CH_2CH_2$ | H. |
|   | 3,7-dimethyl-4-isopropyl-1,6-octadien-3-ol | $CH_3$ | $(CH_3)_2CH$. |
| 6 | 3-isobutyl-7-methyl-1,6-octadien-3-ol | Isobutyl | H. |
| 7 | 4,7-dimethyl-3-butyl-1,6-octadien-3-ol | $C_4H_9$ | $CH_3$. |
|   | 7-methyl-3-ethyl-4-propyl-1,6-octadien-3-ol | $C_2H_5$ | $C_3H_7$. |

*Example 1.*—154 g. (1.0 mol) 4,7-dimethyl-6-octen-3-one prepared according to Serial No. 241036 were added with agitation during a five hour period into a solution of 1.2 mol vinyl magnesium halide in tetrahydrofuran. The reaction mixture was kept at 15–20° C. during the addition and held at least another hour after the end of the addition. Then the reaction mixture was poured simultaneously with a 15% ice cold aqueous solution of 70 g. acetic acid, into a large cooled flask under efficient stirring. The resulting solution separated in two layers. The top layer containing all the product and most of the tetrahydrofuran was distilled at atmospheric pressure or slight vacuum, in order to remove the solvent. On fractionation the crude material yielded 155 g. pure 4,7-dimethyl-3-ethyl-1,6-octadien-3-ol in the form of a colorless liquid $b_{1.0}$:69° C., $N_D^{20}$=1.4700, purity by Vapor Phase Chromatography 99%–100%. This is a yield of 85% of theory. The product has a very lasting odor related to linalool but with a more flowery character and a definite lily of the valley note. It is much more useful in the perfuming of toilet soap than is linalool.

*Example 2.*—2-(3-methyl-2-butenyl)-cyclohexanone (166 g.) was treated with vinyl magnesium halide and worked up as described in Example 1. On fractionation 165 g. of 1-vinyl-2-(3-methyl-2-buten-1-yl)-cyclohexanol (cis and trans isomers) was obtained. $b_{1.0}$:85–89° C., $N_D^{20}$=1.4935–1.4939. Purity by V.P.C. 99–100%, yield 85% of theory. The odor is fresh, leafy with a very natural linden type note.

*Example 3a.*—7-methyl-6-octen-3-one is obtained according to Example 33 of Serial No. 241036 by careful fractionation of the mixture of 3,6-dimethyl-5-hepten-2-one and 7-methyl-6-octen-3-one. The latter boils about 4° C. higher than the former, is found in the later cuts of the fractionation and has the following constants: $b_8$:63° C.; $N_D^{20}$=1.4452. The lower boiling 3,6-dimethyl-5-hepten-2-one has the constants $b_8$:59° C., $N_D^{20}$=1.4424. 140 g. (1.0 mol) 7-methyl-6-octen-3-one were reacted with vinyl magnesium halide as in Example 1 and the reaction mass was worked up in the same manner. There were obtained after fractionation 140 g. 7-methyl-3-ethyl-1,6-octadien-3-ol or 83% of theory. The purity by V.P.C. is 99%. The product is a colorless mobile liquid, $b_{1.2}$:65° C.; $N_D^{20}$=1.4647. The odor is a powerful and fragrant linalool type, more floral and richer than linalool and with a note of mugwet. It is much more lasting than linalool and lends smoothness and coherence to perfume compositions. It is much richer and natural than the known homolog, corresponding to $R_1$=$CH_3$, $R_2$=$CH_3$ in Formula B, above.

*Example 3b.*—A mixture of 7-methyl-6-octen-3-one and 3,6-dimethyl-5-hepten-2-one is reacted with vinyl magnesium halide as in Example 3a, and a mixture of isomers comprising 7-methyl-3-ethyl-1,6-octadien-3-ol and 3,4,7-trimethyl-1,6-octadien-3-ol is obtained. This mixture has the constants: $b_{1.6}$:61° C.; $N_D^{20}$=1.4676, and the purity by V.P.C. is 99.5%. The odor of these mixed isomers is slightly sweeter and less flowing than the single isomer product of Example 3a, but it has the same advantages over linalool. The acetic acid ester of the mixture is a colorless liquid with $b_{0.2}$:62° C.; $N_D^{20}$=1.4581, purity by saponification or V.P.C.:97–98%, the remainder being unchanged alcohol. This ester has a fresh flowery bergamot character much more than linalyl acetate. Used in perfuming soap, it is much more lasting and stable than linalyl acetate and resembles more natural bergamot oil.

*Example 4.*—A mixture of 3,3,6-trimethyl-5-hepten-2-one with 2,7-dimethyl-6-octen-3-one (154 g.) was reacted and worked up as described in Example 1. On fractionation, a mixture of 3,4,4,7-tetramethyl-1,6-octadien-3-ol with 7-methyl-3-isopropyl-1,6-octadien-3-ol was obtained with the constants $b_{1.2}$:64–66° C.;

$$N_D^{20}=1.4620-1.4627$$

purity by V.P.C. is 100%. The product has a strong geranium oil character and it is excellent as a soap perfume.

*Example 5.*—385 g. of 3-ethyl-6-methyl-5-hepten-2-one with 8-methyl-7-nonen-4-one was reacted and worked up as described in Example 1. On fractionation, 294 g. product was obtained with the constants $b_{1.9}$:68–70° C.; $N_D^{20}$=1.4677–1.4680. Purity by V.P.C. is 95–97% identified as a mixture of 3,7-dimethyl-4-ethyl-1,6-octadien-3-ol with 7-methyl-3-propyl-1,6-octadien-3-ol, possessing a sweet and lasting linalool character.

*Example 6.*—232 g. mixture of 6-methyl-3-isopropyl-5-hepten-2-one with 2,8-dimethyl-7-none-4-one was reacted and worked up as described in Example 1. On fractionation 208 g. mixture of 3,7-dimethyl-4-isopropyl-1,6-octadien-3-ol with 3-isobutyl-7-methyl-1,6-octadien-3-ol was obtained. The constants were $b_{1.3}$:70–72° C.; $N_D^{20}$=1.4662–1.4666, purity by V.P.C. 98–100%. It has a fruity linalool note.

*Example 7.*—365 g. mixture of 6,9-dimethyl-8-decen-5-one with 4-propyl-7-methyl-6-octen-3-one was reacted and worked up as described in Example 1. On fractionation, 335 g. of product was obtained, with constants $b_{0.6}$:65–70° C.; $N_D^{20}$=1.4694–1.4700, purity by V.P.C. 100%, identified as a mixture of 4,7-dimethyl-3-butyl-1,6-octadien-3-ol with 7-methyl-3-ethyl-4-propyl-1,6-octadien-3-ol. Yield 80% of theory. It has a fruity linalool odor of exceptional lasting power.

As the foregoing indicates, the present invention embraces a substantial number of new and useful chemical compounds either per se or as novel mixtures thereof, more especially, concomitantly produced isomers. These novel compositions of matter which are thus claimed per se include:

(1) 4,7-dimethyl-3-ethyl-1,6-octadien-3-ol
(2) 1-vinyl-2-(3-methyl-2-buten-1-yl)-cyclohexanol
(3) 7-methyl-3-ethyl-1,6-octadien-3-ol
(4) 3,4,4,7-tetramethyl-1,6-octadien-3-ol
(5) 7-methyl-3-isopropyl-1,6-octadien-3-ol
(6) 3,7-dimethyl-4-ethyl-1,6-octadien-3-ol
(7) 7-methyl-3-propyl-1,6-octadien-3-ol
(8) 3,7-dimethyl-4-isopropyl-1,6-octadien-3-ol
(9) 3-isobutyl-7-methyl-1,6-octadien-3-ol
(10) 4,7-dimethyl-3-butyl-1,6-octadien-3-ol
(11) 7-methyl-3-ethyl-4-propyl-1,6-octadien-3-ol

What is claimed is:
1. An unsaturated carbinol having the formula

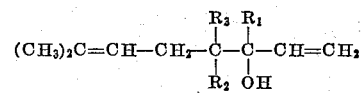

wherein separately $R_1$ is an alkyl radical having from 1 to 6 carbon atoms and $R_2$ is selected from the class consisting of hydrogen and alkyl radicals having from 1 to 5 carbon atoms, wherein $R_3$ is a member of the group consisting of H and methyl, and when $R_1$ is methyl, $R_2$ is an alkyl radical having at least two carbon atoms and $R_3$ is H, and when $R_1$ and $R_2$ are both methyl, $R_3$ is methyl, and together $R_1$ and $R_2$ may form a bridging grouping selected from the group consisting of trimethylene and tetramethylene grouping.

2. 4,7-dimethyl-3-ethyl-1,6-octadien-3-ol.
3. 1-vinyl-2-(3-methyl-2-buten-1-yl)-cyclohexanol.
4. 3,4,4,7-tetramethyl-1,6-octadien-3-ol.
5. 3,7-dimethyl-4-ethyl-1,6-octadien-3-ol.
6. 3,7-dimethyl-4-isopropyl-1,6-octadien-3-ol.
7. 4,7-dimethyl-3-butyl-1,6-octadien-3-ol.
8. 7-methyl-3-ethyl-4-propyl-1,6-octadien-3-ol.
9. As an odoriferous composition, the isomeric mixture consisting essentially of 3,4,4,7-tetramethyl-1,6-octadien-3-ol and 7-methyl-3-isopropyl-1,6-octadien-3-ol.

10. The odoriferous composition consisting essentially of 3,7-dimethyl-4-ethyl-1,6-octadien-3-ol and 7-methyl-3-propyl-1,6-octadien-3-ol.

11. The odoriferous composition consisting essentially of 3,7-dimethyl-4-isopropyl-1,6-octadien-3-ol and 3-isobutyl-7-methyl-1,6-octadien-3-ol.

12. The odoriferous composition consisting essentially of 4,7-dimethyl-3-butyl-1,6-octadien-3-ol and 7-methyl-3-ethyl-4-propyl-1,6-octadien-3-ol.

References Cited by the Examiner

UNITED STATES PATENTS 2,838,576   6/1958   Normant ---------- 260—638

FOREIGN PATENTS 1,041,036   10/1958   Germany.

OTHER REFERENCES

Curvigny et al.: Bull. Soc. Chim. France, 1961, pp. 2423–33.

Mousseron et al.: Comptes Rendus de l'Academie des Sciences, vol. 247, pp. 1811–15, 1958.

Oppenlander et al.: J. Organic Chem., vol. 21, pp. 961–4, 1956.

Sutrzenegger et al.: J. Organic Chem., vol. 28, pp. 920–2, 1963.

LEON ZITVER, *Primary Examiner.*

M. JACOB, T. G. DILLAHUNTY, *Assistant Examiners.*